United States Patent [19]

Vaughan et al.

[11] Patent Number: 4,888,929
[45] Date of Patent: Dec. 26, 1989

[54] SELF-LOCKING DOOR TRIM FOR FLUSH GLASS

[75] Inventors: Robert A. Vaughan, Dearborn; John W. Belser, Northville, both of Mich.

[73] Assignee: The Standard Products Company, Cleveland, Ohio

[21] Appl. No.: 269,131

[22] Filed: Nov. 9, 1988

[51] Int. Cl.[4] .................................................. B60J 1/02
[52] U.S. Cl. ........................................ 52/400; 52/401; 296/201
[58] Field of Search .................. 52/208, 397, 400, 401, 52/823, 716, 717; 296/93, 201; 49/462, 490, 491, 440, 441

[56] References Cited

U.S. PATENT DOCUMENTS

| | | |
|---|---|---|
| 1,714,256 | 5/1929 | Bailey . |
| 2,435,523 | 2/1948 | Weaver et al. ...................... 296/135 |
| 2,606,635 | 8/1952 | Clingman ............................. 189/78 |
| 2,671,541 | 3/1954 | Kramer ................................. 189/78 |
| 2,888,684 | 6/1959 | Icenhower ............................ 4/187 |
| 3,634,991 | 1/1972 | Barton, Jr. et al. .................... 52/718 |
| 3,714,751 | 2/1973 | Lackey .................................. 52/400 |
| 3,744,201 | 7/1973 | Dochnahl ............................. 52/400 |
| 3,766,697 | 10/1973 | Jackson ................................. 52/312 |
| 3,968,613 | 7/1976 | Meyer ................................... 52/400 |
| 4,119,325 | 10/1978 | Oakley et al. ....................... 277/207 |
| 4,147,005 | 4/1979 | Meyer ................................... 52/397 |
| 4,147,006 | 4/1979 | Kruschwitz ........................... 52/401 |
| 4,165,083 | 8/1979 | Dochnahl ............................. 277/184 |
| 4,179,859 | 12/1979 | Fricko ................................... 52/397 |
| 4,649,668 | 3/1987 | Skillen et al. ......................... 49/374 |

FOREIGN PATENT DOCUMENTS

| | | | |
|---|---|---|---|
| 1394484 | 2/1965 | France ................................. 52/400 |
| 1351271 | 4/1974 | United Kingdom .................. 52/400 |

Primary Examiner—David A. Scherbel
Assistant Examiner—Jerrold D. Johnson
Attorney, Agent, or Firm—Harness, Dickey & Pierce

[57] ABSTRACT

A system for attaching automotive trim to a vehicle door is disclosed. The system includes a weather stripping adapted to be secured on a flange of the vehicle. The weather stripping has a member for retaining the weather stripping on the flange and a member for sealing the weather stripping with the vehicle. An automotive trim strip with a retaining portion is coupled with the weather stripping to retain the trim strip onto the vehicle.

14 Claims, 2 Drawing Sheets

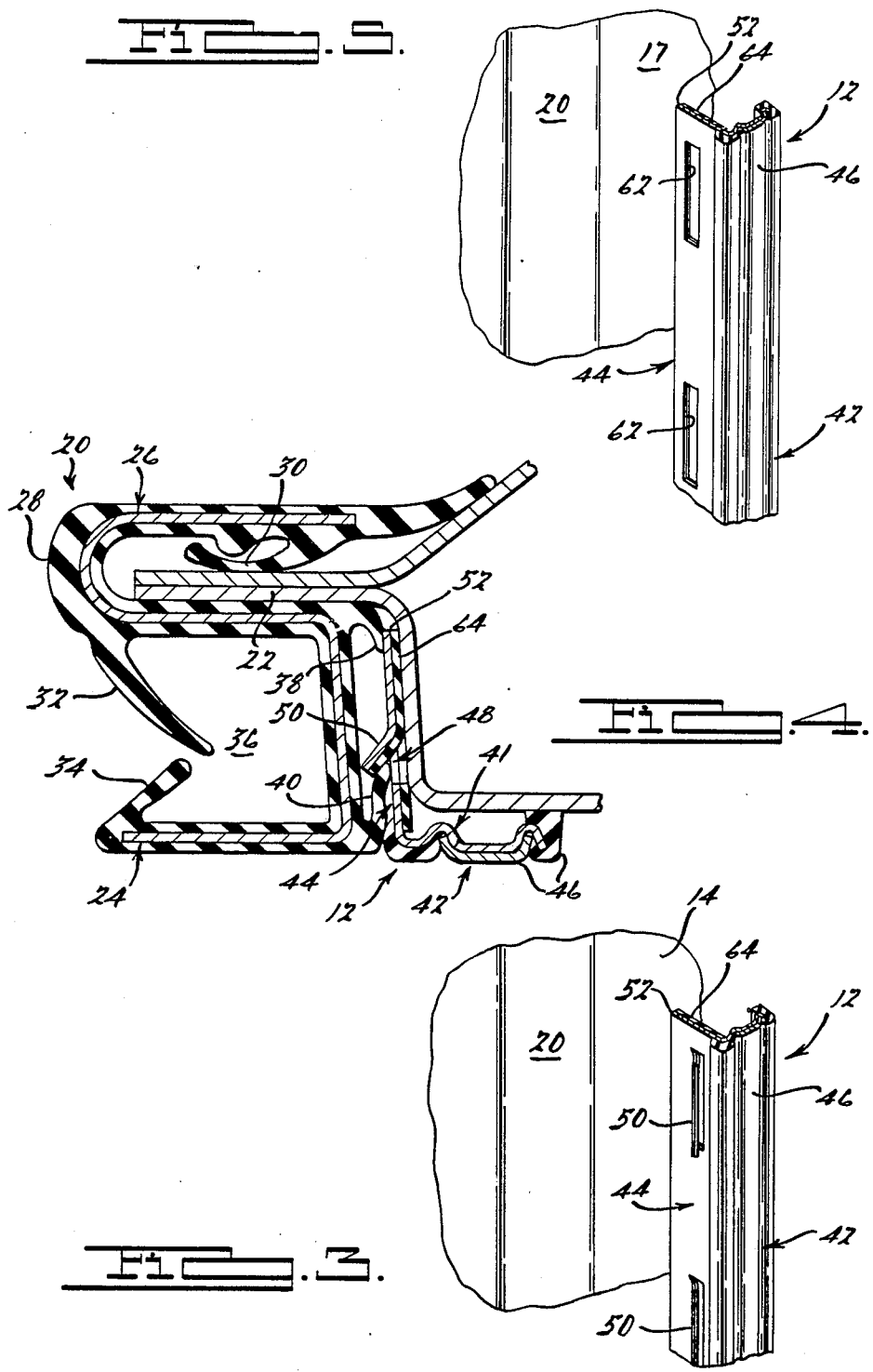

SELF-LOCKING DOOR TRIM FOR FLUSH GLASS

BACKGROUND AND SUMMARY OF THE INVENTION

The present invention relates to automotive vehicles and, more particularly, to automotive vehicle trim retained on a door or the like by weather stripping.

Decorative trim molding on vehicles is very popular in the automotive industry. Decorative trim positioned about doors or the like adds aesthetic value to the vehicle. Ordinarily, this vehicle trim is secured to the door by auxiliary fasteners, such as screws, clips, rivets or the like, to retain the molding onto the vehicle. While these types of fasteners are satisfactory, designers are always searching for alternate methods.

The following U.S. patents illustrate several types of devices which retain automotive trim molding onto a vehicle. The patents are as follows. U.S. Pat. Nos. 1,714,256, issued May 21, 1929 to Bailey; 2,435,523, issued Feb. 3, 1948 to Weaver et al; 2,606,635, issued Aug. 12, 1952 to Clingman; 2,671,541, issued Mar. 9, 1954 to Kramer; 2,888,684, issued June 2, 1959 to Icenhower; 3,634,991, issued Jan. 18, 1972 to Barton Jr. et al; 3,714,751, issued Feb. 6, 1973 to Lackey; 3,766,697, issued Oct. 23, 1973 to Jackson; 3,968,613, issued July 13, 1976 to Meyer; 4,119,325, issued Oct. 10, 1978 to Oakley et al; 4,147,005, issued Apr. 3, 1979 to Meyer; 4,147,006, issued Apr. 3, 1979 to Kruschwitz; 4,165,083, issued Aug. 21, 1979 to Dochnahl; and 4,649,668, issued Mar. 17, 1978 to Skillen et al.

Accordingly, the present invention provides the art with a system to secure automotive trim molding to a vehicle. The present invention provides the art with a flush glass weather stripping which secures automotive trim molding onto the vehicle. The present invention also provides the art with a trim strip that is retained on the vehicle without the use of auxiliary fasteners such as screws, clips, or the like.

From the subsequent detailed description, appended claims and drawings, other objects and advantages of the present invention will become apparent to those skilled in the art.

BRIEF DESCRIPTION OF THE DRAWINGS

FIG. 4 is a horizontal section through the plane designated by line 4—4 thereof of FIG. 2.

FIG. 5 is an exploded perspective view of another door trim strip in accordance with the present invention.

FIG. 6 is a horizontal cross-section like that of FIG. 4 of the door trim strip of FIG. 5.

DETAILED DESCRIPTION OF THE PREFERRED EMBODIMENTS

Figure 1:
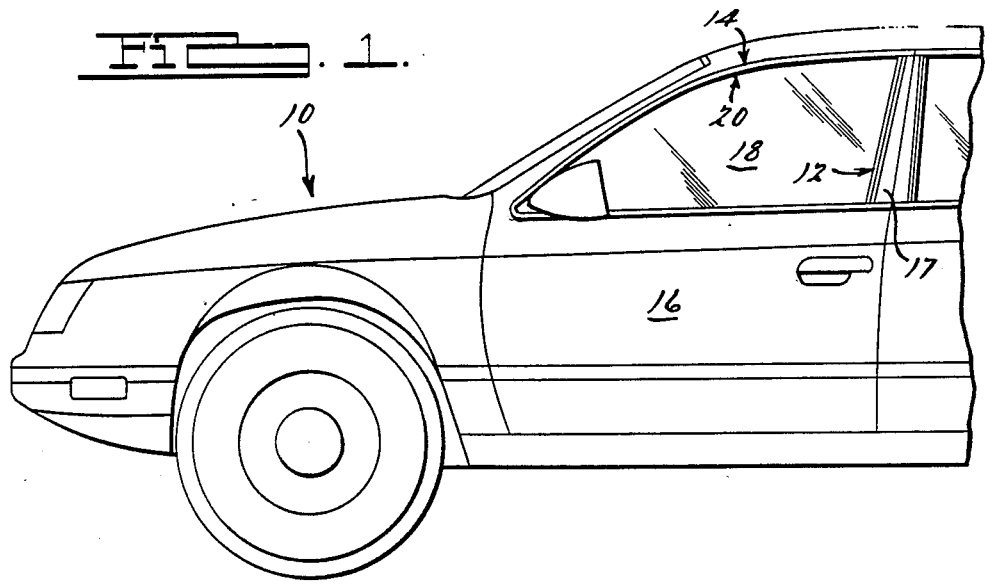
FIG. 1 is a side view of an automotive vehicle including door trim in accordance with the present invention.
Figure 2:
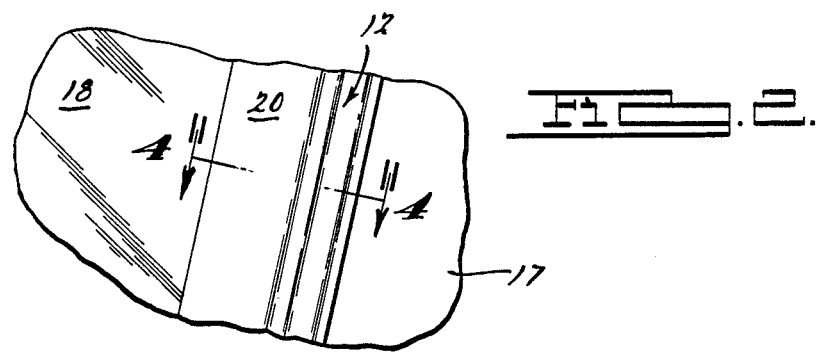
FIG. 2 is an enlarged side view of the door trim in accordance with the present invention.

Turning to the figures, particularly FIG. 1, a vehicle 10 is illustrated with an automotive trim strip 12. The automotive trim strip 12 may be positioned on the door header 14 or the like. The door 16 includes a pillar 17 along with the header 14 which enable a moveable window 18 to be positioned therein. A flush glass weather stripping 20 is positioned about the periphery of the opening defined by pillar 17 and header 14, and is associated with the window 18.

The door 16, pillar 17 and header 14 include a flange 22 peripherally extending into the opening of the door 16. The flange 22 couples with the weather stripping 20 to retain the weather stripping 20 onto the flange 22, as seen in FIG. 4.

The weather stripping 20 includes a metallic S-shaped reinforcement member 24. The reinforcement member 24 includes a U-shaped portion 26 which is positioned about the flange 22. A polymeric skin 28 surrounds the interior and exterior of the reinforcement S-shaped member 24, as seen in FIG. 4. A retaining member 30 extends from the polymeric skin within the U-shaped portion 26. The retaining member 30 couples with the flange 22 to retain the weather stripping 20 onto the flange 22. A pair of sealing members 32 and 34 extend from the polymeric skin 26 into a channel 36. The channel 36 houses and the members 32 and 34 seal the window 18 when the window 18 is in an up position.

The weather stripping 20 also includes sealing members 38 and 40 extending from the skin 26 on the exterior of the S-shaped reinforcement member 24. The sealing members 38 and 40 generally seal the weather stripping 20 against the door pillar 17 and header 24.

Figure 3:
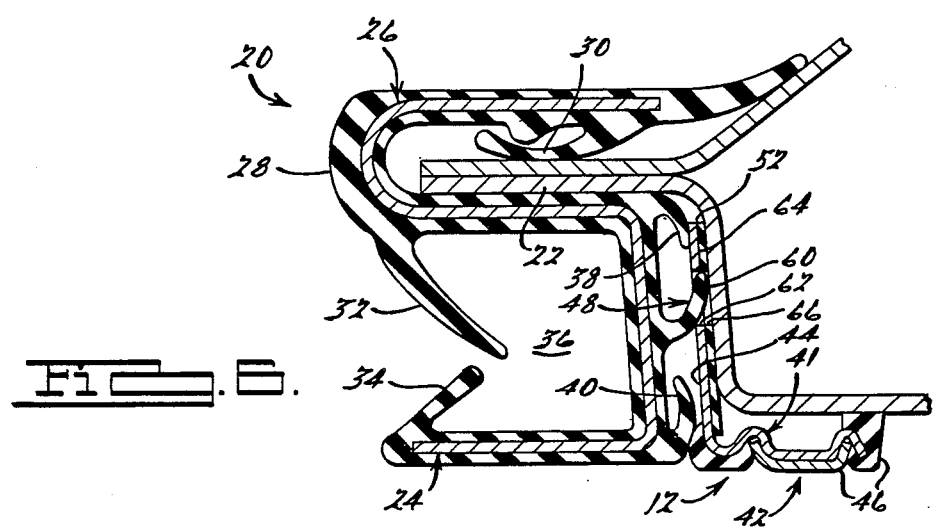
FIG. 3 is an exploded perspective view of door trim in accordance with the present invention.

The decorative trim 12 includes an L-shaped member 41 having a trim portion 42 and a retention portion 44. The trim portion 42 may include various types of metal or polymeric inserts 46 to provide the strip with a pleasing aesthetic appearance, as seen in FIGS. 3 and 4. Also, the trim portion 42 may include any type of design desired by the designer.

The retention portion 44 being substantially flat and planar extends substantially perpendicular to the trim portion 42. The retention portion 44 includes one or more discontinuities 48 which couple with the sealing member 40 to retain the trim strip 12 on the door pillar 17, as seen in FIG. 4. The discontinuities 48 may be one or more tab members 50 extending from the substantially planar surface of the retention portion 44. The tab portions 50 engage the sealing member 40 to mechanically lock the trim strip 12 between the door pillar 17 and the flush glass weather stripping 20. Thus, the automotive trim strip 12 is retained on the door by the weather stripping without the use of auxiliary fasteners such as screws, clips, or the like. The weather stripping 20 thus provides a lock between the weather stripping 20 and the door pillar 17.

Ordinarily, the extending end 52 of the retention portion 44 is wedged and pushed between the sealing member 40 and the door pillar 17. As the retaining portion 44 passes over the sealing member 40, the one or more tabs 50 engage with the sealing member 40, as seen in FIG. 4. This engagement retains the automotive trim strip 12 on the door pillar 17.

To withdraw the trim strip 12 from between the pillar 17 and weather stripping 20, a substantial amount of force is needed to bend back the sealing member 40 so that the one or more tabs 50 exit from between the weather stripping 20 and the pillar 17.

Moving to FIGS. 5 and 6, another embodiment of the present invention is shown. Elements that are the same as previously described are designated with the same reference numeral.

The weather stripping 20 includes an additional sealing member 60 on the polymeric skin 26 on the exterior of the S-shaped reinforcement member 24. The member 60 extends further away from the reinforcement member 24 than sealing members 38 and 40. Generally, the sealing member 60 is positioned between the sealing members 38 and 40.

The automotive trim 12 retaining portion 44 includes one or more apertures 62 in the planar member 44. Generally, the one or more apertures 62 are spaced at desired positions along the retaining member 44. Also, a strip of polymeric material 64 is positioned on one side of the retaining portion 44. The strip 64 includes apertures 66 aligned with the apertures 62 of the retaining portion 44. The polymeric strip 64 abuts the pillar 17, as seen in FIG. 6. The strip enhances the retention of the trim strip 12 between the weather stripping 20 and the pillar 17.

The automotivbe trim strip 12 is slid between the sealing members 40, 60 and 38 and the pillar 17. As the one or more apertures 62 pass the member 60, the member 60 projects into the one or more apertures 62 to retain the automotive trim 12 on the door 16, as seen in FIG. 6.

While the above detailed description described the preferred embodiment of the present invention, it should be understood that the present invention is susceptible to modification, variation and alteration without deviating from the scope and fair meaning of the subjoined claims.

What is claimed is:

1. A system for attaching automotive trim to a vehicle door comprising:
   weather stripping adapted to be secured on a flange of the vehicle door, said weather stripping having means adapted for receiving a movable window, means for retaining said weather stripping on the door flange and means for sealing said weather stripping with the vehicle door; and
   an automotive trim strip having a reinforcement member with an overall L shape, one leg of said L-shaped member including means for retaining said automotive trim strip on the vehicle door and said leg being rigid and adapted to be forced between said weather stripping and said vehicle door to be retained by said weather stripping, said trim strip retaining means couples with said weather stripping sealing means for retaining said automotive trim strip on the vehicle door.

2. The system according to claim 1 wherein said automotive trim retaining means being comprised of one or more tabs extending from said leg, said tabs coupled with said weather stripping for retaining said automotive trim strip on the vehicle door.

3. The system according to claim 2 further comprising a polymeric strip coupled with said trim strip flange and abutting said vehicle door.

4. The system according to claim 2 wherein said tabs are coupled with said sealing means for retaining said trim strip on the vehicle door.

5. The system according to claim 4 wherein said sealing means being comprised of one or more resilient polymeric members extending from said weather stripping and abutting the vehicle door, said tabs coupled with said extending member for retaining said trim strip on the vehicle door.

6. A system for attaching automotive trim strips comprising:
   an automotive vehicle having a member defining an opening for a window or the like, said member including a peripheral flange extending inward into said opening;
   weather stripping adapted to secure to said peripheral flange, said weather stripping including means for receiving a movable window, means for securing said weather stripping to said flange and means for sealing said weather stripping with said vehicle; and
   a trim strip for providing aesthetic appearance to said vehicle, said trim strip having a rigid reinforcement member with an overall L shape, one leg of said L-shaped member including means for securing said trim strip to said vehicle and said leg being wedged between said weather stripping and vehicle to be retained by said weather stripping, said trim strip means for securing mechanically couples with said weather stripping sealing means for securing said trim strip to the vehicle.

7. The system according to claim 6 wherein said trim strip retaining means includes one or more tabs extending from said leg for coupling with said weather stripping for retaining said trim strip on said vehicle.

8. The system according to claim 7 further comprising a polymeric strip coupled with said trim strip flange and abutting said vehicle.

9. The system according to claim 7 wherein said tabs are coupled with said sealing means for retaining said trim strip on the vehicle.

10. The system according to claim 9 wherein said sealing means being comprised of one or more resilient polymeric members extending from said weather stripping and abutting the vehicle, said tabs coupled with said extending member for retaining said trim strip on the vehicle.

11. The system according to claim 7 wherein said trim strip is removable from said vehicle.

12. The system according to claim 6 wherein said trim strip retaining means includes one or more slots in said leg for coupling with said weather stripping for retaining said trim strip on said vehicle.

13. The system according to claim 12 wherein said sealing means is comprised of a plurality of resilient members extending from said weather stripping for abutting and sealing said vehicle.

14. The system according to claim 13 wherein one of said plurality of sealing members extends further from said weather stripping than the others, said further extending member coupled with said one or more slots for mechanically retaining said trim strip on said vehicle.

* * * * *